United States Patent [19]

Stichel

[11] Patent Number: 5,115,541
[45] Date of Patent: May 26, 1992

[54] HOSE CLIP

[75] Inventor: Willi Stichel, Maintal, Fed. Rep. of Germany

[73] Assignee: Rasmussen GmbH, Maintal, Fed. Rep. of Germany

[21] Appl. No.: 656,995

[22] Filed: Feb. 15, 1991

[30] Foreign Application Priority Data

Feb. 22, 1990 [DE] Fed. Rep. of Germany ....... 4005631

[51] Int. Cl.⁵ .............................................. B65D 63/02
[52] U.S. Cl. .................................... 24/20 R; 24/20 S; 24/271
[58] Field of Search ............. 24/20 R, 20 CW, 20 S, 24/20 TT, 20 EE, 20 W, 21, 23 EE, 271; 248/74.3; 285/198, 253

[56] References Cited

U.S. PATENT DOCUMENTS

| 554,808 | 2/1896 | Weaver | 24/20 LS |
|---|---|---|---|
| 1,073,533 | 9/1913 | Shipp | 24/271 |
| 1,191,219 | 7/1916 | Pelter | 285/253 |
| 1,233,054 | 7/1917 | Hecox | 24/271 |
| 2,155,705 | 4/1939 | Gottwald | 24/271 |
| 2,395,745 | 2/1946 | King | 248/74.3 |
| 2,666,004 | 1/1954 | Gerrard | 154/44 |
| 3,477,106 | 11/1969 | Tetzlaff et al. | 285/253 |
| 4,308,648 | 1/1982 | Fay | 24/20 CW |
| 4,315,348 | 2/1982 | Oetiker | 24/20 CW |
| 4,402,113 | 9/1983 | Smith | 248/74.3 |
| 4,402,113 | 9/1983 | Smith | 24/20 R |
| 4,523,352 | 6/1985 | Wachter | 24/20 TT |
| 4,627,645 | 12/1986 | Sauer | 185/39 |

FOREIGN PATENT DOCUMENTS

| E34206B | 9/1988 | Austria . | |
|---|---|---|---|
| 0783296 | 4/1968 | Canada | 24/20 CW |
| 0166756 | 3/1989 | European Pat. Off. . | |
| 1096129 | 12/1960 | Fed. Rep. of Germany | 24/271 |
| 1525495 | 2/1971 | Fed. Rep. of Germany . | |
| 8903321 | 7/1989 | Fed. Rep. of Germany . | |
| 0954388 | 4/1964 | United Kingdom | 24/271 |
| 1138064 | 12/1968 | United Kingdom . | |

Primary Examiner—Victor N. Sakran
Attorney, Agent, or Firm—Peter K. Kontler

[57] ABSTRACT

A hose clip wherein a flexible annular strap can be place around one end portion of a hose and a relatively small portion (less than 50 percent) of the inner side of the strap is overlapped by the convex external surface of a deformable insert. The space between the insert and the strap confines one or more springs, or one or more springs are outwardly adjacent the strap, to bias the concave internal surface of the insert against the adjacent portion of the hose. The strap can constitute an endless ring or it can be of finite length and the hose clip then comprises a tightening mechanism for the strap. The insert can be biased by one or more leaf springs, by one or more C-springs or by one or more coil springs. The spring or springs can be caused to store more energy than required to maintain the hose in sealing engagement with a pipe or nipple, and the surplus energy is dissipated as soon as the strap is placed around the hose and the tubular body is inserted into the hose. At least one end portion of the insert can be connected to the strap, and at least one end portion of the insert is slidable circumferentially of the strap. The resistance of the insert to flexing at least matches the resistance of the strap. The curvature of the internal surface of the insert can approximate or match the curvature of the non-overlapped portion of the inner side of the strap.

46 Claims, 4 Drawing Sheets

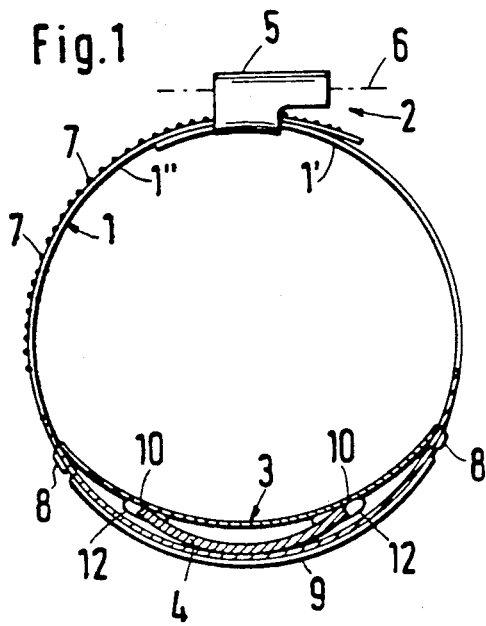
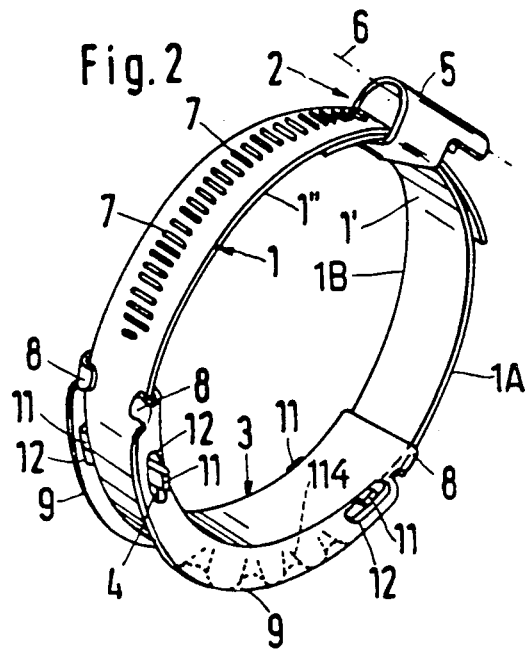
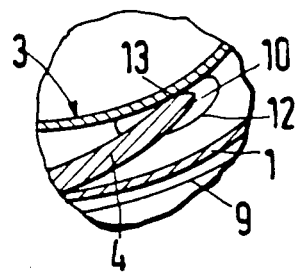
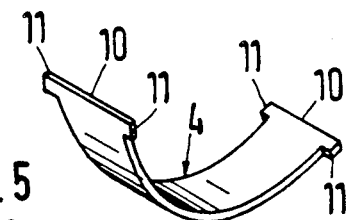
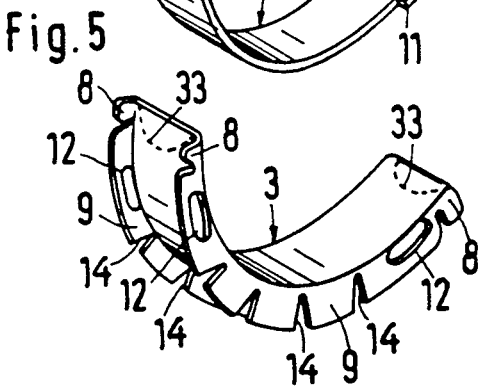
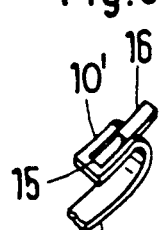
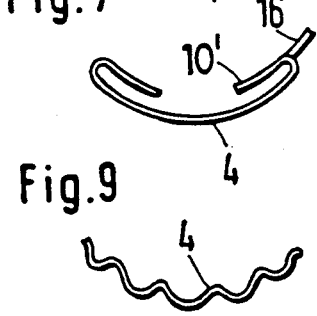
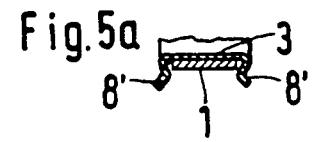
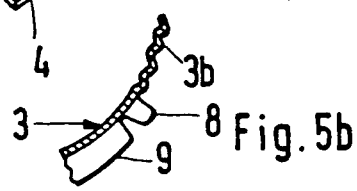

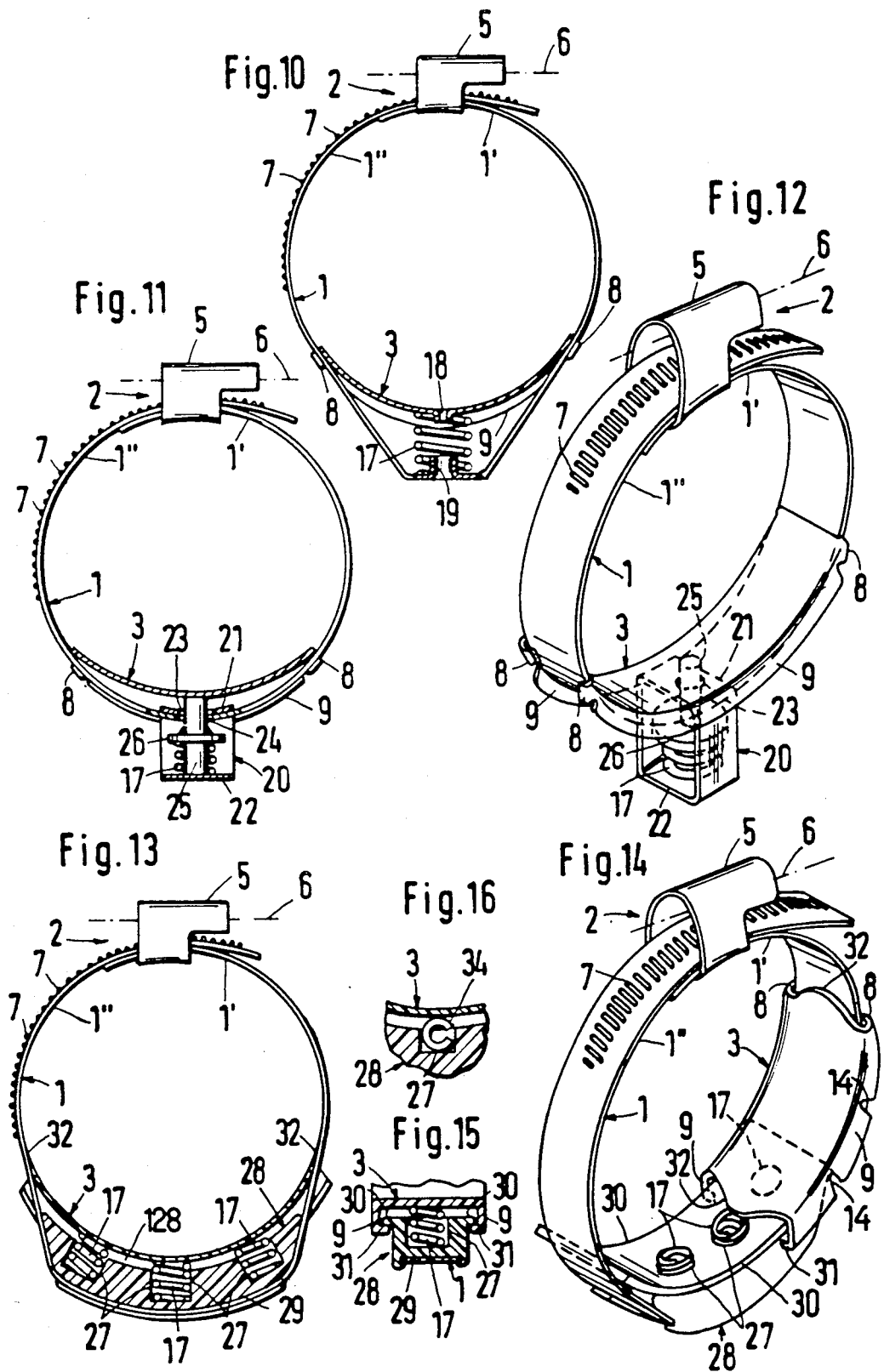

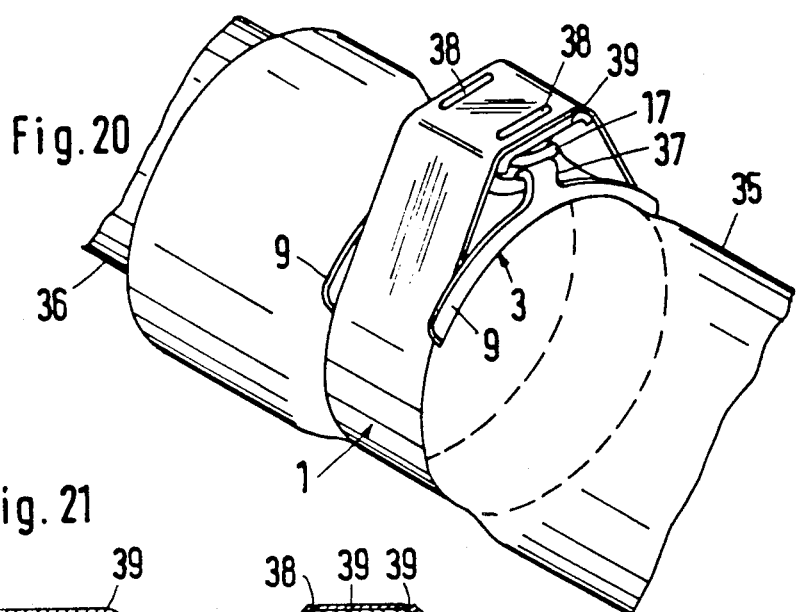
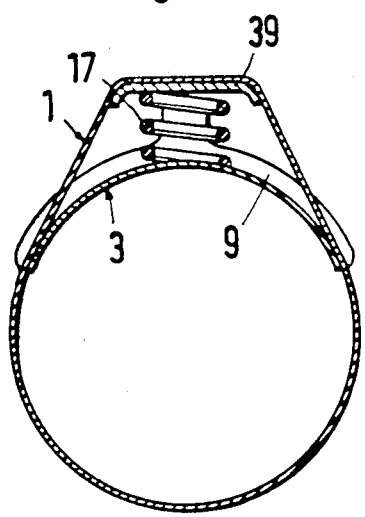
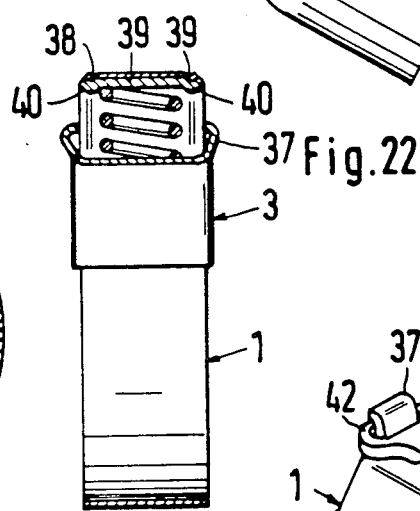
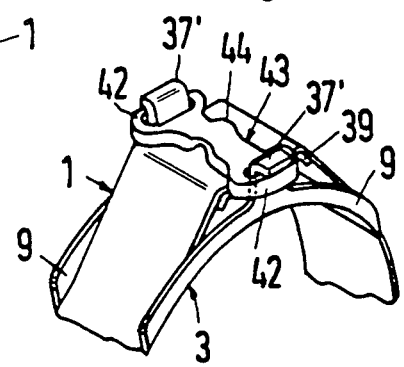
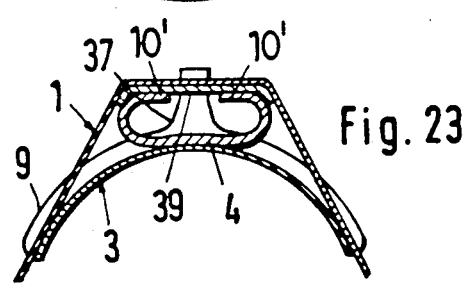
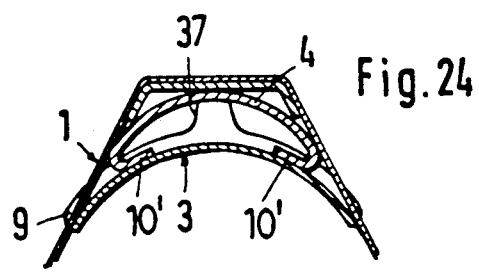
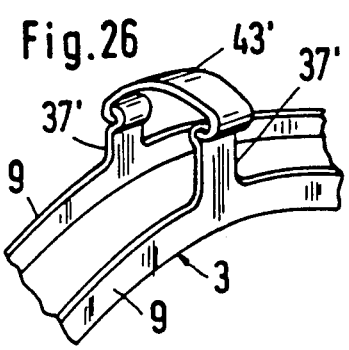

1

HOSE CLIP

BACKGROUND OF THE INVENTION

The invention relates to hose clips in general, and more particularly to improvements in hose clips of the type wherein a strap surrounds a tightening or clamping insert or shield and the insert is biased against the peripheral surface of a hose by one or more springs.

European Pat. No. 0 166 756 B1 to Enlund discloses a hose clip which includes a corrugated spring with axially parallel undulations or corrugations. The spring is intended to automatically compensate for variations of tightening, tensioning or clamping action upon the confined part of a hose. Such variations can develop as a result of changes of elasticity of the hose, e.g., in response to heating or cooling. The just outlined situation will develop when the hose is used to convey streams of a cool fluid medium as well as streams of a hot fluid medium. Furthermore, the elasticity of the hose is likely to change as a result of aging. In all such instances, the corrugated spring is expected to automatically compensate for variations of elasticity of the hose and to thus ensure that the hose is reliably clamped without necessitating manual adjustment of clamping action by rotating a screw or bolt (reference may be had, for example, to commonly owned U.S. Pat. No. 4,627,645 to Sauer) or by tightening the strap around the hose in another way (reference may be had, for example, to commonly owned U.S. Pat. No. 4,523,352 to Wachter).

It has been found that, in many instances, heretofore known hose clips cannot compensate for all (i.e., for an entire range of) fluctuations of clamping force upon the hose. In addition, variations of the clamping force cannot always be detected as soon as they develop, for example, if such variations are attributable to heating or cooling of a metallic pipe or tube which is surrounded by a hose which, in turn, is surrounded by the strap of a hose clip. Still further, pronounced variations of clamping force upon a hose are likely to take place in response to substantial and prolonged rise of temperature of the hose as well as when the hose is subject to permanent deformation (for example, as a result of the application of a large tensioning or tightening while the temperature of the hose varies within a wide range). Under such circumstances, the material of the hose is likely to flow from within the area which is surrounded by the strap of the hose clip. An undulate spring of the type disclosed in the patent to Enlund is highly unlikely to automatically compensate for a full range of variations of clamping force under the aforediscussed circumstances. Thus, it is necessary to reduce the diameter of the strap, e.g., by manually adjusting the angular position of a screw or bolt or by manually adjusting the position of another strap tightening device.

Any variations of the diameter of the strap necessitate a shifting of a portion of the strap circumferentially of the hose. This can create problems when a hose clip of the type disclosed by Enlund has been in use for an extended period of time because the internal surface of the strap and/or the internal surface of the clamping insert is likely to adhere to the peripheral surface of the hose as a result of the application of a pronounced clamping force and/or in response to the application of pronounced thermal stresses. In many instances, the strap and/or the insert adheres to the hose with a force which cannot be readily overcome by the strap and/or by the insert, i.e., not even a small portion of the strap is capable of moving relative to and in the circumferential direction of the hose so that the entire hose clip must be replaced or the strap and the insert are incapable of ensuring the establishment and maintenance of a requisite clamping or tightening force. In other words, the hose is likely to permit leakage of confined fluid medium as a result of the application of varying thermal stresses and/or as a result of aging (reduction of elasticity) of the material of the hose. The fluid medium escapes between the internal surface of the hose and a pipe, tube, nipple or other rigid conductor of fluid media.

The situation is substantially the same if the insert and the spring, which operates between the insert and the strap, are replaced with one or more springs (e.g., coil springs or packages of dished springs) which react against the housing of a strap tightening device and bear against the head of, or a nut on, the shank of a rotary tightening bolt or screw. Thus, once the strap begins to adhere to the peripheral surface of the hose, it cannot slide in the circumferential direction of the hose in response to tightening of the bolt or screw, i.e., the hose clip cannot compensate for variations of the tightening or clamping action upon the hose.

European Pat. No. E 34 206 B to Ribrant discloses a hose clip wherein the insert is a circumferentially complete strip which is surrounded by a wire-like or strip-shaped strap. A screw is used to tighten the strap around the insert. The internal surface of the insert will begin to adhere to the external surface of the hose after a certain period of use of the patented strap, especially if the hose is subjected to a pronounced tightening or clamping action and its temperature varies within a rather wide range.

Published German patent application No. 1 525 495 of Oetiker discloses a hose clip wherein the strap is provided with a plurality of integral or separately produced springs. The springs are supposed to increase the tightening or clamping action upon a hose which is likely to lose elasticity due to aging or as a result of the application of pronounced thermal stresses. The internal surface of the strap is likely to permanently adhere to the external surface of the hose and to thus prevent automatic, or even manual, adjustment of the clamping or tightening action.

British Pat. No. 1.138.064 to Nicholson discloses a band clamp or hose clip with a band or strap which is adjustable by means of a worm or T-bolt, and a bedding band or insert inside the adjustable band. The adjustable band has one or more lateral corrugations so that it is capable of self-contraction in order to maintain a desired radially inward pressure. The insert or bedding band is likely to strongly adhere to the external surface of a hose in response to aging of the material of the hose and/or in response to prolonged application of pronounced tightening or clamping (radially inward) forces.

U.S. Pat. No. 2,666,004 to Gerrard discloses a steel strapping and shield which can be used to bias insulating and/or structural members on tanks, vessels and the like. The strapping comprises a metallic expander band with corrugated and uncorrugated sections, a shield which can be inserted between the corrugated sections and one or more structural members, and a device which detachably mounts the shield on the expander band and can be applied subsequent to mounting of the band. The patented apparatus cannot be classified as a hose clip since its principal purpose is to secure insulation to tanks or similar large and bulky structures which expand and contract under various physical changes, such as temperature changes. The purpose of the shield which is disclosed by Gerrard is to prevent the segments of the corrugated sections from acting like saw teeth during the cyclic change of expansion and contraction when the expander band is mounted over soft, porous insulating material. A hose clip is not mounted over a porous material because this would defeat the purpose of the hose clip, namely to establish a fluidtight connection between a hose and a pipe, tube, nipple or the like.

German Utility Model No. G 89 03 321.3 to Anderstorps Werkstads AB discloses a hose clip wherein a split ring of spring steel has a U-shaped cross-sectional outline with a convex side facing the part to be clamped. The end portions of the split ring can be indirectly moved toward or away from each other by a screw or bolt. The split ring has two marginal flanges or legs which are provided with notches to form a series of identical teeth. The split ring is surrounded by a strap, one end portion of which is secured to the housing for the nut or bolt, and the other end portion of which has teeth mating with the thread of the screw or bolt. The convex inner side of the split ring is pressed against and is likely to adhere to the external surface of a hose when the strap is tightened and its diameter is reduced to thereby reduce the diameter of the split ring.

OBJECTS OF THE INVENTION

An object of the invention is to provide a hose clip which is less likely to be bonded to a hose than a conventional hose clip.

Another object of the invention is to provide a hose clip which is more likely to prevent leakage for long periods of time than heretofore known hose clips.

A further object of the invention is to provide a novel and improved insert or shield for use in the above outlined hose clip.

An additional object of the invention is to provide novel and improved biasing means for use in the above outlined hose clip.

Still another object of the invention is to provide a novel and improved strap for use in the above outlined hose clip.

A further object of the invention is to provide the above outlined hose clip with novel and improved means for preventing adherence of the strap and/or insert to the peripheral surface of a hose.

Another object of the invention is to provide a hose clip wherein the clamping or tensioning action upon a hose can be regulated with a high degree of accuracy not only immediately subsequent to mounting of the hose clip but also after extended periods of use.

An additional object of the invention is to provide a hose clip which can more readily and more reliably compensate for aging of the material of a hose and/or for pronounced fluctuations of temperature of the hose than heretofore known hose clips.

Another object of the invention is to provide the hose clip with novel and improved devices for prestressing the means for biasing the insert and the strap against a hose.

A further object of the invention is to provide the above outlined hose clip with novel and improved means for establishing reliable connections between its component parts.

An additional object of the invention is to provide a novel and improved method of manipulating the above outlined hose clip preparatory to, during and subsequent to mounting on a hose.

Another object of the invention is to provide a hose clip which can employ an endless strap or a strap of finite length.

A further object of the invention is to provide the above outlined hose clip with novel and improved means for guiding the insert or shield during movement relative to the strap.

SUMMARY OF THE INVENTION

The invention is embodied in a hose clip which comprises an annular strap having an inner side which can engage the external surface of a hose and an outer side, and an insert or shield which is adjacent the inner side of the strap and has a concave internal surface which can engage the external surface of the hose while the hose is surrounded by the strap. The insert overlaps and extends along less than one-half of the inner side of the strap and has two end portions which are spaced apart from each other in the circumferential direction of the strap. At least one end portion of the insert is movable along the inner side and in the circumferential direction of the strap, and the hose clip further comprises means for biasing the insert away from the inner side of the strap (i.e., substantially radially of and toward the center of the space which is surrounded by the strap) so that a hose which is surrounded by the strap and by the insert is clampingly engaged by the internal surface of the insert and by the non-overlapped inner side of the strap. This ensures that the inner side of the hose is maintained in sealing engagement with the external surface of a pipe, nipple or a like tubular body which is to be separably or permanently secured to and is telescoped into the hose.

The hose clip preferably further comprises means for at least temporarily and preferably separably coupling the insert to the strap.

In accordance with a presently preferred embodiment, the insert has an arcuate shape and has a convex external surface having a curvature which matches or at least approximates the curvature of the non-overlapped portion of the inner side of the strap. The flexural strength (i.e., the resistance to bending or flexing) of the insert preferably matches or exceeds the flexural strength of the strap.

The insert can be provided with substantially radially outwardly extending projections (e.g., in the form of lugs) which are adjacent the circumferentially extending marginal portions of the strap to limit the axial movability of the insert with reference to the strap. At least one of the projections can be made of a resilient material, and the strap can include a portion which is received between the projections of the insert by snap action; this prevents accidental separation of the strap from the insert prior to mounting of the strap on the end portion of a hose.

The insert can be provided with elongated flanges which extend substantially radially outwardly beyond the marginal portions of the strap to even further reduce the likelihood of accidental separation of the insert from the strap and to even more reliably ensure that the extent of movability of the insert in the axial direction of the strap is limited. At least one of the flanges can be provided with at least one substantially V-shaped notch which diverges in a direction radially outwardly of the respective marginal portion of the strap; such notch can enhance the flexibility of the respective flange and of the entire insert. Alternatively, at least one of the flanges can be provided with at least one undulation or pleat having a width (as measured in the circumferential direction of the strap) which increases in a direction radially outwardly from the respective marginal portion; such undulation or pleat also promotes the flexibility of the respective flange and of the entire insert.

The biasing means can comprise at least one leaf spring which is installed between the insert and the strap. The leaf spring is preferably provided with a concave internal surface which confronts the external surface of the insert, and the leaf spring has first and second ends which are spaced apart from each other in the circumferential direction of the strap and abut the insert. At least one end of the leaf spring is preferably movable in the circumferential direction of the strap, and the median or central portion of the leaf spring (as seen in the circumferential direction of the strap) is or can be adjacent the inner side of the strap. The median portion of the leaf spring abuts the external surface of the insert if the ends of the leaf spring abut the inner side of the strap.

At least one end of the leaf spring can be provided with projections (e.g., in the form of pins or studs or lugs) which extend substantially axially of the strap, and the flanges of the insert are then provided with openings for such projections. The openings can constitute slots which are elongated in the circumferential direction of the strap, and the projections of the leaf spring extend into the respective slots with freedom of movement in the circumferential direction of the strap.

Each end of the leaf spring can constitute a portion which is bent over itself through an angle of approximately 180° to overlie and to be radially (inwardly or outwardly) spaced apart from the median or central portion of the leaf spring. At least one of the bent portions of the leaf spring can constitute a tongue which extends circumferentially of the strap away from the median portion of the leaf spring; such tongue slidably engages the external surface of the insert or the inner side of the strap. The at least one bent portion of the leaf spring can be provided with a substantially U-shaped slit, and the tongue then constitutes an integral part of the at least one bent portion and is formed as a result of bending the material within the slit.

At least one end of the leaf spring can be provided with a rounded surface which abuts the external surface of the insert or the inner side of the strap.

The leaf spring can constitute an undulate leaf spring with undulations extending in substantial parallelism with the axis of the strap.

Instead of embodying a leaf spring, the biasing means can comprise at least one spring (such as a coil spring) having an axis which extends substantially radially of the strap and is surrounded by the body of the spring. A first end of such radially extending spring is adjacent the external surface of the insert, and the second end of such spring is adjacent the inner side of the strap. The external surface of the insert can be provided with a first retainer (e.g., a retainer which constitutes an integral tubular portion of the insert) which extends into the first end of the spring, and the inner side of the strap can be provided with a second retainer (e.g., an integral tubular portion of the strap) which extends into the second end of the spring.

The hose clip can further comprises a housing which is installed between the insert and the strap and has at least one socket which is open toward the external surface of the insert. The biasing means can comprise at least one spring (e.g., a coil spring or a substantially C-shaped spring) having a first portion in the socket and a second portion bearing against the external surface of the insert. The housing can be provided with a plurality of sockets which are spaced apart from each other in the circumferential direction of the strap and each of which can receive the first portion of a discrete coil spring, C-shaped spring or any other spring which can bias the insert against a hose while the hose is surrounded by the strap. The marginal portions of the housing can be provided with tracks or rails which extend in the circumferential direction of as well as axially of the strap, and the insert can be provided with followers which track the rails; this enables the insert to move circumferentially of the strap along the marginal portions of the housing. The external surface of the housing (i.e., that surface which confronts the inner side of the strap) can be provided with a groove for the adjacent portion of the strap. This ensures that the housing and the strap are held in optimum positions relative to each other.

At least one end portion of the insert can constitute an undulate portion extending in the circumferential direction of the strap and having undulations which are substantially parallel to the axis of the strap.

The hose clip can further comprise a casing and a pusher which extends substantially radially of the strap and is reciprocable in the casing. The strap has an opening for the pusher and the casing has a wall which is outwardly adjacent the outer side of the strap. The biasing means comprises at least one spring which reacts against the wall of the housing and bears against the pusher to urge the pusher radially inwardly through the opening of the strap and against the external surface of the insert. The casing can further comprise a second wall which is disposed between the inner side of the strap and the external surface of the insert and has an opening in register with the opening of the strap. The pusher is provided with an abutment which is located in the casing and is outwardly adjacent the outer side of the strap. The spring can constitute a leaf spring which bears against the abutment and reacts against the first mentioned wall of the casing to urge the pusher into and beyond the registering openings so that the inner side of the insert is biased against the external surface of a hose which is surrounded by the strap.

The hose clip can further comprise a tensioning or tightening device having a housing for the two overlapping end portions of the strap. Such hose clip further comprises means for coupling at least one end portion of the strap to the tensioning device, and the latter further comprises means for moving the other end portion of the strap relative to the one end portion to thereby increase or reduce the force with which the internal surface of the insert and the non-overlapped inner side of the strap bear against the peripheral surface of a hose. The means for moving the other end portion of the strap relative to the one end portion can comprise a screw or bolt which is rotatable in the housing of the tensioning or tightening device and has threads mating with external threads on the other end portion of the strap.

The insert can be provided with substantially centrally located hooks which extend radially outwardly along and beyond the marginal portions of the strap and have free ends at the outer side of the strap. The hooks cooperate (directly or indirectly) with the strap to stress the biasing means between the insert and the strap prior to placing of the strap and insert around an end portion of a hose. The hooks are or can be deformable (e.g., by a screw driver or another rudimentary tool) to thus enable the biasing means to dissipate some energy and to bias the internal surface of the insert and the non-overlapped inner side of the strap against a hose. The free ends of the hooks can releasably engage the strap in stressed condition of the biasing means. To this end, the outer side of the strap can be provided with recesses for the free ends of the hooks; such recesses can be defined by corrugations which are integral parts of the strap.

The hooks can be said to form part of means for maintaining the biasing means in stressed condition, and such maintaining means can further comprise a yoke which overlies the outer side of the strap and is preferably separably connected with the free ends of the hooks to maintain the biasing means in stressed condition. As mentioned above, the hooks can be disposed substantially midway between the end portions of the insert, and the yoke can include at least one weakened portion along which the yoke can be broken (e.g., by flexing it with the working end of a screw driver or another suitable implement) to facilitate separation of the destroyed yoke from the free ends of the hooks and to thus enable the biasing means to dissipate some energy at a time when the strap and the insert surround a hose.

In lieu of or in addition to one or more weakened portions, the yoke can be provided with eyelets which releasably or separably receive the free ends of the hooks; for example, the working end of a screw driver can be inserted between the outer side of the strap and the yoke, and the working end is then turned to cause the eyelets to slide off the free ends of the respective hooks. Instead of being provided with eyelets, the ends of the yoke can be provided with portions which are bent toward the outer side of the strap and overlie the axially bent free ends of the hooks so that the yoke can be separated from the hooks by causing it to move relative to the hooks in the circumferential direction of the strap.

The novel features which are considered as characteristic of the invention are set forth in particular in the appended claims. The improved hose clip itself, however, both as to its construction and the mode of assembling, applying and using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a partly side elevational and partly sectional view of an assembled hose clip which embodies one form of the invention;

FIG. 2 is a perspective view of the hose clip which is shown in FIG. 1;

FIG. 3 is an enlarged view of a detail in the hose clip of FIG. 1, showing the manner in which one end of a leaf spring which constitutes the means for biasing the insert is slidable along the external surface of the insert;

FIG. 4 is a perspective view of the leaf spring which is used in the hose clip of FIG. 1;

FIG. 5 is a perspective view of the insert which is used in the hose clip of FIG. 1;

FIG. 5a transverse sectional view of the insert and of the strap in a modified hose clip wherein the strap is held by snap action between two outwardly extending projections of the insert;

FIG. 5b is a fragmentary partly elevational and partly sectional view of an insert at least one end portion of which is provided with an undulate extension and which can be used in lieu of the insert of FIG. 5;

FIG. 6 is a side elevational view of a leaf spring which can be used in lieu of the leaf spring of FIG. 4;

FIG. 7 is a side elevational view of a modification of the leaf spring of FIG. 6;

FIG. 8 is a fragmentary perspective view of one end of the leaf which is shown in FIG. 7;

FIG. 9 is an elevational view of an undulated spring which can be used as a substitute for the spring of FIG. 4, 6 or 7;

FIG. 10 is a partly side elevational and partly sectional view of a further hose clip wherein the biasing means comprises a coil spring;

FIG. 11 is a partly side elevational and partly sectional view of a hose clip which constitutes a modification of the hose clip of FIG. 10;

FIG. 12 is a perspective view of the hose clip of FIG. 11;

FIG. 13 is a partly side elevational and partly sectional view of a hose clip which constitutes a second modification of the hose clip of FIG. 10;

FIG. 14 is a perspective view of the hose clip of FIG. 13, the insert being spaced apart from its operative position in the circumferential direction of the strap;

FIG. 15 is a fragmentary transverse sectional view of the hose clip of FIGS. 13 and 14;

FIG. 16 is a fragmentary transverse sectional view of a further hose clip wherein the biasing means includes one or more C-shaped springs;

FIG. 20 is a perspective view of the hose clip of FIG. 17 but showing the spring in partly unstressed condition;

FIG. 21 is a transverse sectional view of the hose clip which is shown in FIG. 20;

FIG. 22 is an axial sectional view of the hose clip which is shown in FIGS. 20 and 21;

FIG. 23 is a fragmentary transverse sectional view of a hose clip which constitutes a first modification of the hose clip of FIGS. 20 to 22;

FIG. 24 is a similar fragmentary transverse sectional view of a hose clip which constitutes a modification of the hose clip of FIG. 23;

FIG. 25 is a fragmentary perspective view of a hose clip wherein the biasing means is stressed prior to mounting of the hose clip on a hose in a manner different from that shown in FIGS. 17-19, 20-22, 23 and 24; and FIG. 26 is a fragmentary perspective view of still another hose clip wherein the insert can be caused to maintain the biasing means in fully stressed condition in a manner departing from that which is shown in FIG. 25.

DESCRIPTION OF PREFERRED EMBODIMENTS

Figure 17:
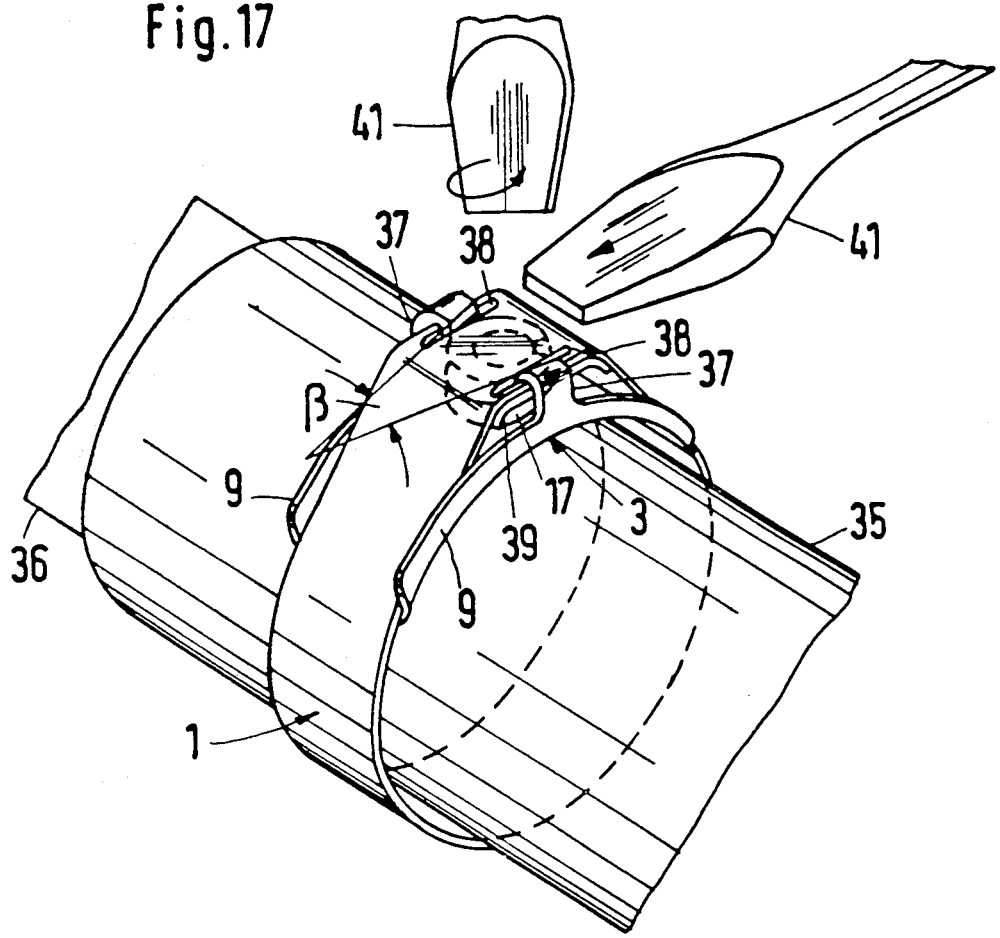
FIG. 17 is a perspective view of a hose clip which is applied around one end portion of a hose which, in turn, surrounds a rigid pipe, tube or nipple, and further showing two positions of the working end of an implement which can be utilized to reduce the amount of energy which is stored by the biasing means between the strap and the insert.

Referring first to FIGS. 1 and 2, there is shown a hose clip which can be applied around one end portion of a hose 35 (FIGS. 17 and 20) to maintain the internal surface of the hose in sealing engagement with the external surface of a rigid pipe, nozzle or another tubular body 36 (also shown in FIGS. 17 and 20). The hose 35 is made of an elastomeric material so that it undergoes at least some deformation and tends to reassume its undeformed state when surrounded and clamped by an annular strap 1 and an arcuate insert or shield 3 of the improved hose clip. The latter further comprises a tightening or clamping device 2 for the strap 1 and biasing means 4 between the insert 3 and the adjacent (overlapped) portion of the inner side of the strap.

The tightening or clamping device 2 comprises a housing 5 which is welded, soldered, riveted or otherwise secured to one end portion 1' of the strap 1 and provides a passage for the other end portion 1". The end portion 40" overlies the end portion 1' and is provided with a series of axially parallel external projections or teeth 7. The housing 5 receives a rotary screw or bolt 6 (indicated in FIGS. 1 and 2 by a phantom line) having an external thread in mesh with the adjacent teeth 7. Thus, when the screw or bolt 6 is rotated in one direction, the device 2 enlarges the diameter of the strap 1 but the diameter of the strap is reduced when the screw or bolt is rotated in the opposite direction. The exact details of the manner in which the device 2 can increase or reduce the size of the strap 1 are well known in the art and need not be described here in greater detail. The arrangement is preferably such that the thread of the bolt or screw 6 is in self-locking engagement with the teeth 7 so that the diameter of the strap 1 does not change until and unless the screw or bolt is intentionally rotated in a clockwise or in a counterclockwise direction. The teeth 7 can constitute radially outwardly displaced portions of the material of end portion 1" of the strap 1.

When properly installed within the confines of the annular strap 1, the insert or shield 3 (hereinafter called insert) is located substantially diametrically opposite the housing 5 of the tightening or clamping device 2. This insert has a concave internal surface which faces toward the center of the annular strap 1 and toward the housing 5, and a convex external surface which faces the overlapped portion of the inner side of the strap. The insert 3 can be said to form part of a means for subjecting the hose 35 to a more or less permanent and uniform radial compressing or clamping action, and such means further includes the biasing means 4 here shown in the form of an elongated arcuate leaf spring having a concave inner side facing the external surface of the insert 3 and a convex outer side facing the overlapped portion of the inner side of the strap 1.

In accordance with a feature of the invention, the insert 3 overlies less than one-half of the inner side of the strap 1 and its resistance to flexure at least matches but preferably exceeds that of the strap 1. It suffices, at least in many instances, if the insert 3 overlies a little more than one-fourth of the inner side of the strap 1. As can be seen in FIG. 5, the major portion of the insert 3 resembles a portion of a short cylinder having a radius of curvature which is greater than that of the strap 1; therefore, the center of curvature of the internal surface of the insert 3 does not coincide with the center of the strap 1 when the strap receives the insert in a manner as shown in FIGS. 1 and 2.

The two end portions of the insert 3 are provided with pairs of radially outwardly extending projections 8 in the form of lugs which extend along and outwardly beyond the respective marginal portions 1A and 1B of the strap 1. As can be seen in FIGS. 1 and 2, the lugs 8 of the insert 3 are bent over the outer side of the strap 1 in assembled condition of the improved hose clip so that the lugs can be said to constitute a means for coupling the insert 3 to the strap. The nature of the coupling is such that at least one end portion (i.e., at least one pair of lugs 8) of the insert 3 is free to move along and in the circumferential direction of the strap 1. At the same time, the lugs 8 prevent excessive shifting of the insert 3 in the axial direction of the strap 1, i.e., in parallelism with the elongated external teeth 7 of the end portion 1" of the strap.

The lugs 8 need not be bent over the outer side of the strap 1. Thus, and as shown in FIG. 5a, at least one lug 8' at least at one end of the insert 3 can cooperate with the adjacent lug 8' at the other marginal portion of the strap 1 to hold the strap by snap action. Such construction further reduces the likelihood of undesirable shifting of the insert 3 and strap 1 relative to each other in the axial direction of the strap because the clearance between the inner sides of the lugs 8' and the adjacent edge faces of the respective marginal portions 1A, 1B is reduced to a minimum. Furthermore, it is then necessary to apply a certain force in order to move the lugs 8' in the circumferential direction of the strap 1.

The curvature of the insert 3 need not appreciably depart from the curvature of the adjacent (overlapped) portion of the strap 1 and can match or approximate the curvature of the non-overlapped portion of the strap. The strap 1 and/or the insert 3 can be made of a metallic or plastic material. In the embodiment of FIGS. 1 and 2, not only the strap 1 but also the insert 3 and the leaf spring 4 consist of a metallic material.

The insert 3 further comprises two elongated flanges 9 each of which extends radially outwardly along and beyond the respective marginal portion 1A or 1B of the strap 1. Each of the two illustrated flanges 9 can extend all the way from a lug 8 at one end to a lug 8 at the other end of the insert 3. In order to ensure that the flanges 9 will not unduly reduce the ability of the insert 3 to undergo deformation and to conform to the shape of adjacent portion of the external surface of a hose 35, the flanges are preferably provided with substantially V-shaped recesses or notches 14 (see FIG. 5) having a width which increases in a direction away from the center of the strap 1, i.e., radially outwardly in a direction beyond the respective marginal portions 1A and 1B of the strap. The same result can be achieved by providing the flanges 9 with undulations or pleats 114 (FIG. 2) the width and depth of which increase in a direction radially outwardly of the overlapped portion of the strap 1. The configuration of the flanges 9 which are shown in FIGS. 2 and 5 is such that their height (as measured in the radial direction of the strap 1) decreases from the center toward the end portions of the insert 3, namely from the median portions of the flanges toward the respective lugs 8. The purpose of the flanges 9 is to assist the lugs 8 in preventing excessive axial displacements of the insert 3 relative to the strap 1 as well as to confine the leaf spring 4 in a sickle-shaped chamber between the convex external surface of the insert and the overlapped portion of the concave inner side of the strap 1.

The curvature of the leaf spring 4 is such that the central portion of its outer side abuts the inner side of the flange 1 and that its ends 10 (as seen in the circumferential direction of the strap 1) abut the external surface of the inert 3. The flanges 9 reduce the deformability of the insert 3 to such an extent that the insert is not likely to buckle in response to the application of bias by the ends 10 of the leaf spring 4. The deformability of the insert 3 should suffice to ensure that its internal surface can conform to the adjacent portion of the peripheral surface of a hose 35 when the improved hose clip is in actual use. At such time, the curvature of the internal surface of the insert 3 and the curvature of the peripheral surface of the hose 35 conform, at least substantially, to the curvature of the external surface of the tubular body 36 which is to be maintained in sealing engagement with the hose.

The ability of the insert 3 to conform to the shape of the peripheral surface of a hose 35 on a tubular body 36 can be enhanced if at least one end portion of the insert is provided with an undulate or corrugated extension 3b (FIG. 5b) having corrugations (hills and valleys) which extend in parallelism with the axis of the strap 1.

The curvature of the leaf spring 4 in undeformed condition of the insert 3 is more pronounced than that of the insert and/or strap 1; this enables the median portion of the spring 4 to abut the inner side of the strap 1 while the two ends 10 abut the external surface of the insert. The ends 10 of the leaf spring 4 are provided with pairs of aligned axially parallel (lateral) projections or protuberances in the form of lugs 11 each of which extends into an opening 12 in the respective flange 9 of the insert 4. The illustrated openings 12 are elongated slots which extend in the circumferential direction of the strap 1 so that each of the two ends 10 has limited freedom of movement relative to the insert 1 and vice versa in the circumferential direction of the strap. It often suffices if only one pair of lugs 11 is received in elongated slot-shaped openings 12 of the flanges 9; the other two openings 12 can constitute circular holes which receive the corresponding lugs 11 with minimal play. In other words, it often suffices to assemble the insert 3 and the leaf spring 4 in such a way that one end 10 is more or less fixedly connected to the adjacent portions of the flanges 9 but the other end 10 is free to move relative to the insert 4 in the circumferential direction of the strap 1. An advantage of an insert 3 with flanges 9 each of which has two elongated slot-shaped openings 12 for the respective lugs 11 of the spring 4 is that the bias of the spring is more uniformly distributed in the circumferential direction of the strap 1.

FIG. 3 shows that the ends 10 of the leaf spring 4 can be provided with rounded surfaces 13 (only one shown) which abut the convex external surface of the insert 4. This reduces the likelihood of excessive friction and enables the ends 10 to slide along the external surface of the insert with a minimum of friction.

FIG. 6 shows that the ends 10' of the leaf spring 4 can be bent through approximately 180° so that their tips are nearer to the central portion of the spring. Such ends 10' have rounded surfaces which perform the function of rounded surfaces 13 on the ends 10 of the leaf spring which is shown in FIG. 3. The bent ends 10' are radially offset relative to the central portion of the leaf spring 4 of FIG. 6. Another advantage of the ends 10' is that the leaf spring 4 of FIG. 6 has a greater range or greater spring excursion than the simpler leaf spring 4 of FIGS. 3 and 4.

The leaf spring 4 of FIGS. 7 and 8 is similar to that of FIG. 6 except that one of the ends 10' is formed with a U-shaped slit 15. The material within the slit 15 is bent outwardly to form a tongue 16 which abuts the external surface of the insert 3 in assembled condition of the hose clip which embodies the leaf spring of FIGS. 7 and 8. The tongue 16 contributes to overall length of the leaf spring 4 in the circumferential direction of the strap. Moreover, and if the inner side of the tongue 16 is the only part of the leaf spring 4 of FIGS. 7 and 8 which contacts the insert, the distance between those portions of the leaf spring which contact the insert is increased accordingly in a simple and inexpensive way. Such greater distance between the loci of contact between the ends 10' of the leaf spring 4 and the insert 3 contributes to more uniform distribution of spring bias upon the insert; this further reduces the likelihood of buckling of the insert 4 at the points or lines or areas of contact with the ends 10' of the leaf spring. In this respect, the leaf spring 4 of FIGS. 7 and 8 is more satisfactory than that which is shown in FIG. 1.

FIG. 9 shows an undulate or corrugated leaf spring 4 which can be used in lieu of the leaf spring of FIG. 4, 6 or 7. Each corrugation or undulation of the spring 4 of FIG. 9 can be caused to engage the external surface of the insert 3 to even further enhance uniform distribution of spring bias upon the insert when the hose clip employing the spring of FIG. 9 is in actual use. The corrugations or undulations of the leaf spring 4 of FIG. 9 are parallel or nearly parallel to the axis of the strap 1.

An important advantage of the improved hose clip is the shortness of the insert 3 relative to the strap 1, i.e., the length of the overlapped portion of the inner side of the strap 1 is less than half and can be less than one-third of the entire inner side of the strap. This is important when the insert 3 is to be deformed by the spring 4 so that it ensures clamping of the peripheral surface of a hose 35 by the internal surface of the insert and by the non-overlapped inner side of the strap 1 with a desired force. The movements of the relatively short insert 3 in response to the bias of the spring 4 are primarily radial; therefore, the spring 4 can cooperate with the relatively short insert to compensate for loss of elasticity of the material of the hose even if the non-overlapped portion of the inner side of the strap and/or the concave internal surface of the insert 3 happen to adhere to the peripheral surface of the hose. In other words, the possibility that the strap and/or the insert might adhere to the hose in response to loss of elasticity of the hose and/or for any other reasons does not prevent the insert 3 and the spring 4 from compensating for loss of elasticity of the hose.

The insert 3 can be readily separated from the strap 1, either by bending the tips of the lugs 8 from the positions which are shown in FIG. 1 or 2 to those which are shown in FIG. 5, or by simply spreading the lugs 8' of FIG. 5a apart to permit movements of the insert 3 and strap 1 radially of the strap and away from each other. Such separability of the insert 3 from the strap 1 is desirable and advantageous because this renders it possible to detach the strap 1 from a damaged insert 3 and to use the strap in another hose clip or to detach the insert from a damaged strap for reuse in another hose clip. Moreover, detachability of the insert 3 from the strap 1 renders it possible to gain access to the leaf spring 4, e.g., for the purpose of replacing a damaged spring or of replacing a satisfactory spring with a stronger or weaker spring.

The lugs 8 or 8' constitute but one form of means for separably coupling the strap 1 with the insert 3, at least while the hose clip is not in use. Such lugs are preferred at this time because they not only permit rapid and simple attachment of the insert 3 to or its separation from the strap 1 but also because they can perform one or more additional desirable functions, such as accurate guidance of the insert for movement in the circumferential direction of the strap, confinement of the insert to limited stray movements in the axial direction of the strap, and the possibility of repeatedly coupling the insert to and uncoupling the insert from the strap.

An advantage of the resilient or at least partly resilient lugs 8' is that they need not be made of a ductile material, i.e., their material is or can be the same as the preferred material of the remaining portion of the insert.

The flanges 9 constitute a desirable but optional feature of the insert 3. Such flanges contribute to more uniform distribution of spring bias in the longitudinal direction of the insert which, in turn, reduces the likelihood of excessive flexing or even buckling of the insert at the points, lines or areas of engagement with the ends 10 or 10' of a leaf spring 4. As mentioned above, the recesses or notches 14 and/or the undulations 114 of the flanges 9 prevent the insert 3 from offering excessive resistance to deformation by the spring 4. The recesses 14 and the undulations 114 are optional because it often suffices to configurate the flanges 9 in such a way that their height deceases from the center toward the end portions of the insert. However, and as shown in FIGS. 2 and 5, it is possible to provide the insert 3 with flanges which have a height that gradually decreases toward both end portions of the insert and, in addition, are provided with recesses 14 and/or undulations 114.

The illustrated leaf springs 4 can be replaced with other types of leaf springs without departing from the spirit of the invention. The illustrated leaf springs are preferred at this time due to their simplicity, reliability and low cost. In addition, the bias of a leaf spring of the type shown in FIG. 3, 4, 6, 7 or 9 can be readily selected in such a way that the insert 3 is biased against a hose with a required force such as is necessary to compensate for loss of elasticity (e.g., due to aging or excessive or prolonged deformation) of the material of the hose.

The openings 12 in the flanges 9 of the insert and the lugs 11 of the spring 4 of FIGS. 1 to 4 exhibit the advantage that the insert 3 and the spring 4 can be assembled with each other and shipped or stored in assembled condition. This reduces the likelihood of accidental misplacement of the insert and/or of the spring. In addition, the person in charge of assembling the strap 1 with the insert 3 and spring 4 need not be concerned with the positioning of the spring 4 relative to the strap because the spring 4 automatically assumes an optimum position relative to the strap as soon as the latter is properly assembled with the insert 3.

The springs which are shown in FIGS. 6-9 can also comprise a single pair or two pairs of lugs 11 to facilitate and simplify their assembly with an insert 3.

Leaf springs of the type shown in FIGS. 6-8 are desirable and advantageous when the user of the hose clip desires to prevent excessive penetration of end portions of the insert into the material of an elastic hose. Thus, the bent-over ends 10' increase the range or travel of the leaf spring which, in turn, results in more uniform distribution of spring bias longitudinally of the insert. Therefore, the end portions of the insert are less likely to subject the adjacent portions of a hose to very pronounced deformation such as would interfere with or prevent movements of the end portions of the insert in the circumferential direction of the strap when the shape of the insert is to be changed in order to more accurately conform the internal surface of the insert to the adjacent portion of the peripheral surface of a hose. The provision of rounded surfaces 13 or rounded end portions 10' also reduces the likelihood of excessive resistance to movements of the end portions of an insert in the circumferential direction of the strap. Similar or analogous results can be achieved by using the corrugated spring 4 of FIG. 9.

The spring 4 need not be coupled to the insert 3, and the insert need not be positively (form-lockingly) coupled to the strap 1, e.g., in a manner as shown in FIGS. 1-2 or in FIG. 5a. However, it is often desirable and advantageous to establish form-locking connections between the insert 3 and spring 4 or between the insert 3 and strap 1, at least before the hose clip is put to use. As mentioned above, this simplifies the assembly of the hose clip and reduces the likelihood of accidental separation of the insert 3 and spring 4 from each other with attendant reduction of the likelihood of accidental misplacement of the part 3 and/or 4.

When the hose clip is in actual use, the curvature of the concave internal surface of the insert 3 normally matches or at least approximates the curvature of the non-overlapped portion of the inner side of the strap 1.

An advantage of the feature that the resistance of the insert to flexural stresses preferably matches or exceeds the flexural strength of the strap 1 is that the insert is less likely to undergo excessive deformation, e.g., at the locations of contact with the ends 10 or 10' of the leaf spring 4 which is shown in FIGS. 1, 3, 4 and 6 to 8 or at the locations of contact with the corrugations or undulations of the spring 4 which is shown in FIG. 9.

FIG. 10 shows a hose clip wherein the biasing means comprises a spring 17 with an axis which extends substantially radially of the strap 1 and which is surrounded by the body of the spring. The strap 1 is identical with the strap of the hose clip which is shown in FIGS. 1 and 2, i.e., it also comprises an endless strip of metallic or plastic material with overlapping end portions 1', 1" one of which has a set of external teeth 7 mating with the thread of a screw or bolt 6 (indicated by a phantom line) which is rotatable in the housing 5 of a strap tightening or clamping device 2. The illustrated spring 17 is a coil spring having an inner end which surrounds an annular retainer 18 of the insert 3 and an outer end which surrounds an annular retainer 19 of the strap 1. The retainers 18, 19 are integral tubular portions of the insert 3 and strap 1, respectively. The insert 3 is or can be identical with the insert of FIGS. 1-3, FIG. 5, FIG. 5a or FIG. 5b.

An advantage of the coil spring 17 is that its range (also called excursion or travel) is greater than that of a leaf spring. In addition, the coil spring 17 can constitute a mass-produced commercially available standard article. A large spring travel or range is often desirable because the hose clip which utilizes such spring can compensate for a wide range of changes of elasticity of the hose.

Referring to FIGS. 11 and 12, there is shown a hose clip which constitutes a modification of the hose clip of FIG. 10. The strap 1 carries a housing or casing 20 with a first wall 22 which is outwardly adjacent and radially spaced apart from the outer side of the strap 1 diametrically opposite the housing 5 of the tightening device 2, and a second wall 21 which is adjacent the inner side of the strap 1. The wall 21 has an opening 23 (e.g., in the form of a circular hole) in register with a similar opening or hole 24 of the strap 1. The openings 23, 24 receive the inner portion of a radially extending rod-shaped pusher 25 which has an abutment or collar 26 in the interior of the casing 20 and serves to exert pressure against the median portion of the external surface of the insert or shield 3. A coil spring 17 reacts against the inner side of the wall 22 and bears against the abutment or collar 26 to urge the inner end face of the pusher 25 against the insert 3.

An advantage of the hose clip of FIGS. 11-12 over the hose clip of FIG. 10 is that the strap 1 of FIGS. 11-12 can retain its substantially annular shape and need not be provided with a tubular retainer (19) for the radially outer end of the spring 17; however, such retainer can be provided if desired or necessary. Moreover, the axial length of the coil spring 17 in the hose clip of FIGS. 11-12 can be selected practically at will because it is not limited by the extent of deformability of the strap 1 at a location diametrically opposite the tightening device 2.

The hose clip of FIGS. 11 and 12 can be modified by replacing the opening polygonal casing 20 with a fully or nearly fully sealed or closed casing (e.g., a substantially cubical hollow casing with six walls and with slots for the strap 1 in two of its walls). Such closed or nearly fully closed casing prevents penetration of dust to the spring 17 and to the pusher 25 and its abutment or collar 26.

Furthermore, the wall 22 can be provided with an opening for the pusher 25, i.e., the pusher can be reciprocably guided by the strap 1 (opening 24), inner wall 21 (opening 23) and outer wall 22. This would greatly reduce the likelihood of jamming of the pusher 25 by preventing the pusher from assuming a position other than exactly radially of the strap 1.

If the springs 17 are replaced with dished springs, the dished springs preferably resemble washers and surround the pusher 25 between the abutment or collar 26 and the outer wall 22.

The provision of the casing 20 renders it possible to avoid pronounced deformation of the strap 1 in the region diametrically opposite the tightening device 2. Thus, that portion of the strap which is adjacent the insert 3 can have a curvature which matches the curvature of the remaining major portion of the strap and the curvature of the insert. Moreover, the length and the compressibility of the spring 17 or an analogous biasing device can be selected practically at will.

FIGS. 13, 14 and 15 illustrate a further hose clip wherein the space between the external surface of the insert 3 and the overlapped portion of the inner side of the strap 1 receives a plastic housing 28 with a series of sockets 27 which are spaced apart from each other in the circumferential direction of the strap. Each socket 27 is open toward the external surface of the insert 3 and receives a portion of a discrete coil spring 17. The radially outermost convolutions of the springs 17 react against the surfaces at the closed outer ends of the respective sockets 27, and the radially innermost convolutions of these springs bear against the external surface of the insert 3.

The housing 28 is made of a plastic material, the same as the insert 3. The material of the insert may but need not be identical with the material of the housing 28. Furthermore, it is possible to make the insert 3, as well as the housing 28, from a suitable metallic material. The configuration of the outer side of the housing 28 determines the shape of the adjacent portion of the strap 1, and the configuration of the inner side of the housing 28 is or can be complementary to that of the adjacent portion of the external surface of the insert 3. The outer side of the housing 28 is provided with an undercut groove 29 (see particularly FIG. 15) which receives the adjacent portion of the strap 1, preferably with snap action in a manner and for the purposes as described with reference to FIG. 5a.

The housing 28 is further provided with axially extending marginal flanges, rails or tracks 30 which guide the respective flanges 9. Such flanges can be said to constitute followers which track the rails 30 and have inwardly bent radially outermost portions 31 which overlie the outer sides of the rails 30 and cooperate with the latter to confine the insert 3 to movements in the circumferential direction of the strap 1.

The width of the flanges 9 in the radial direction of the strap 1 determines the extent of movability (note the clearance 128 in FIG. 13) of the housing 28 and insert 3 relative to each other in the radial direction of the strap 1. Thus, the clearance 128 determines the extent to which the insert 3 can move radially of the strap 1 toward and away from the concave inner side of the housing 28, i.e., against the opposition or under the bias of the springs 17. The flanges 9 are provided with V-shaped recesses or notches 14 (and/or with undulations or pleats 114) in order to enhance the flexibility of the insert 3.

The end portions of the insert 3 are provided with lobes 32 which are bounded by convex edge faces and serve the same purpose, or a similar purpose, as the undulate extension 3b of the insert 3 which is shown in FIG. 5b. The lobes 32 enable the insert 3 to more accurately and more readily conform its configuration to that of the adjacent (overlapped) portion of the strap 1. It is desirable to impart to the lobes 32 a curvature which is more pronounced than that of the strap 1; this ensures that the central portions of the lobes 32 are less likely to be caught in the grooves at the inner sides of teeth 7 on the end portion 1" of the strap 1 when the insert 3 is caused to move in the circumferential direction of the strap. Such configuration of the lobes 32 is particularly desirable if the strap 1 is provided with a long row of external teeth 7 (each of which overlies an internal groove), e.g., with a row which extends from the tip of the end portion 1" and all the way or even beyond the point diametrically opposite the housing 5 of the tightening device 2. As already mentioned above, the teeth 7 are preferably formed by pressing selected portions of the strap 1 radially outwardly, as seen in FIGS. 13 and 14.

Catching of the end portions of the insert 3 in the grooves at the inner sides of the teeth 7 can also be prevented in another way, for example, as shown in FIG. 5 by the dotted lines 33. Thus, the end faces or edge faces of the insert 3 can be provided with half moon-shaped recesses or notches which are large enough to ensure that the end portions of the insert engage the inner side of the strap 1 only in the regions between the ends of the teeth 7 and the respective marginal portions, i.e., those parts of the end portions of the insert 3 which engage the inner side of the strap 1 bypass the grooves which are provided in the inner side of the strap 1 as a result of the making of teeth 7.

During assembly of the hose clip of FIGS. 13, 14 and 15, a median portion of the strap 1 is caused to snap into the groove 29 of the housing 28 in a first step. The next step involves insertion of the springs 17 into the sockets 27. The insert 3 can be assembled with the strap 1 prior or subsequent to snapping of the strap into the groove 29 of the housing 28, and the insert 3 is thereupon caused to slide along the strap 1 in a counterclockwise direction (as seen in FIG. 14) toward the position of FIG. 13 in which the external surface of the insert is engaged by the innermost convolutions of all three coil springs 17. During movement in the circumferential direction of the strap 1, the insert 3 is guided by the housing 28 because the bent end portions 31 of the flanges 9 are caused to slide along the outer sides of the respective rails or tracks 30.

An advantage of the housing 28 is that it cooperates with the flanges 9 to fully or nearly fully confine the springs 17 in the space between the insert 3 and that portion of the strap 1 which is received in the groove 29 of the housing 20. This reduces the likelihood of penetration of dust and/or other contaminants into contact with the springs 17 and/or into contact with surfaces bounding the sockets 27. Foreign matter between the convolutions of the springs 17 would prevent full compression or shortening of these springs and would thus reduce the ability of the springs and insert 3 to compensate for a wide range of changes of elasticity of the hose which is surrounded by the strap 1 and insert 3.

The coil spring 17 of FIG. 10 or FIGS. 11–12 and/or one or more coil springs 17 in the hose clip of FIGS. 13 to 15 can be replaced with dished springs, e.g., with packages of dished springs which are capable of urging the insert 3 toward a hose 35 with a very large force. For example, a package of dished springs which replace the spring 17 of FIG. 10 can be adequately confined in the space between the insert 3 and the adjacent portion of the strap 1 by using washer-like springs which surround the tubular portions 18, 19. At least one of the tubular portions 18, 19 can be lengthened so that it is axially movably telescoped into or telescopically receives the other tubular portion.

If one or more springs 17 of the hose clip which is shown in FIGS. 13–15 are replaced with washer-like dished springs, the convex external surface of the insert 3 can be provided with radially outwardly extending guide pins or posts (not shown) which extend into and guide the adjacent washer-like dished springs. The guide pins or posts can be welded, riveted or otherwise secured to the insert 3 if they are not formed as integral parts of the insert. Such guide pins or posts could perform the additional function of guiding the insert 3 for movement radially of the strap 1, i.e., it would then be possible to dispense with the lugs 8 and/or flanges 9 and/or with the inwardly bent radially outermost portions 31 of the flanges.

FIG. 16 shows that the coil springs 17 of FIGS. 13–15 can be replaced with substantially C-shaped springs 34. The sockets 27 are then shaped accordingly, namely to retain the C-shaped springs 34 in a plane which is normal to the axis of the strap (not shown in FIG. 16). In other words, whereas the coil springs 17 of FIGS. 13–15 are normally received in cylindrical sockets 28, the sockets for the C-shaped springs 34 are preferably flat to ensure that the springs which extend thereinto are maintained in an optimum orientation relative to the insert 3.

An advantage of the housing 28 and of several spaced-apart springs 17 or 34 in the sockets of such housing is that the bias of the springs is distributed nearly all the way between the two end portions of the insert 3. Moreover, the springs 17 or 34 can be maintained in positions of optimum orientation relative to the insert 3 for any desired periods of time and in a simple and inexpensive way.

An advantage of the hose clips of FIGS. 13 to 16 is that, once the hose clip is detached from a hose, the condition of the springs 17 or 34 in the sockets 27 can be ascertained in a simple and time-saving manner. All that is necessary is to slide the insert 3 along the strap 1 and along the housing 28 toward and beyond the position which is shown in FIG. 14 so that the sockets 27 become exposed and the insert 3 affords access to the springs in such sockets. The rails or tracks 30 of the housing 28 ensure predictable guidance of the insert 3 during movement in the circumferential direction of the strap 1.

The undercut groove 29 can be omitted or replaced with one or more pairs of lugs which extend radially outwardly from the external surface of the housing 28 and can engage and hold a portion of the strap 1 in a manner analogous to that shown in FIG. 5a.

FIGS. 17 to 22 show a modified hose clip which employs an endless strap 1, i.e., the tightening device 2 can be omitted. The circumferential length of the strap 1 which forms part of this hose clip is greater than that of the hose 35 which is shown in a position in which one of its end portions surrounds a portion of a rigid tubular body 36, such as a nipple, a pipe or a like part.

The median portion of the insert 3 is provided with substantially radially outwardly extending hooks 37 which form part of means for maintaining the spring 17 of the biasing means in fully or nearly fully compressed condition (see the fully or nearly fully compressed spring 17 in FIGS. 18 and 19) while the hose clip is in storage or in transport. The means for maintaining the spring 17 in maximally or greatly stressed condition further comprises that portion of the strap 1 which is outwardly adjacent the spring 17, and more particularly an externally grooved platform of the strap which is flanked by the hooks 37. This platform has two circumferentially extending recesses or grooves 38 which can be formed as a result of appropriate deformation of the strap 1 (see FIG. 19).

Figure 18:
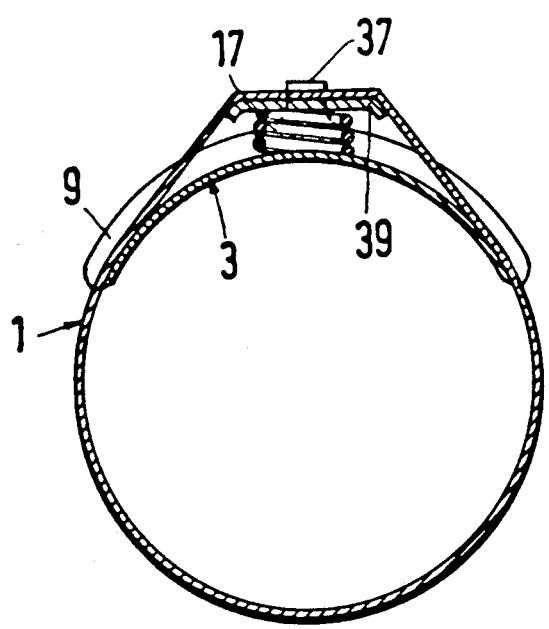
FIG. 18 is a transverse sectional view of the hose clip which is shown in FIG. 17, with the coil spring of the biasing means being shown in fully stressed condition, the same as in FIG. 17.
Figure 19:
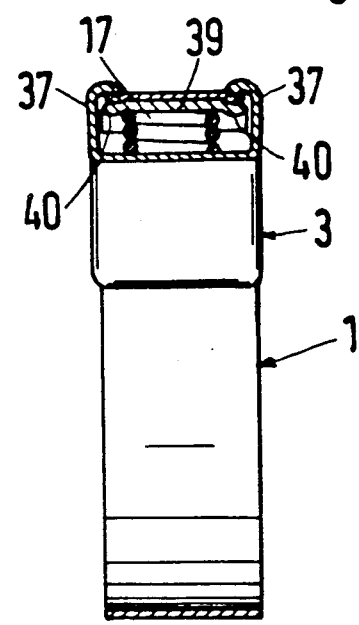
FIG. 19 is an axial sectional view of the hose clip which is shown in FIGS. 17 and 18.

The hooks 37 are or can be elastic and tend to assume the positions which are shown in FIGS. 17–19, namely positions in which their radially inwardly bent free ends or tips extend into the adjacent grooves 38. This ensures that the platform of the strap 1 cooperates with the insert 3 (i.e., with the hooks 37 of the insert) to maintain the spring 17 in fully or nearly fully compressed condition in which the spring acts not unlike a solid body because the neighboring convolutions actually or nearly contact each other.

The inner diameter of the hose clip which is shown in FIGS. 17–19 is sufficiently large to enable an operator or a robot to slip the hose clip onto the end portion of the hose 35 before the latter is slipped onto the tubular body 36. The next step involves disengagement of the hooks 37 from the platform of the strap 1 in order to enable the spring 17 to dissipate some energy so that the concave internal surface of the insert 3 and the non-overlapped portion of the inner side of the strap 1 are biased against the peripheral surface of the hose 35 (see FIGS. 20-22) in order to ensure that the internal surface of the hose is maintained in reliable sealing engagement with the peripheral surface of the rigid tubular body 36.

The aforementioned platform of the strap 1 is outwardly adjacent a rectangular or square reinforcing or stiffening member 39 in the form of a plate which is engaged and biased by the adjacent radially outermost convolution of the spring 17. The grooves or recesses 38 in the platform of the strap 1 also contribute to rigidity or stiffness of that portion of the strap 1 against which the spring 17 reacts while urging the insert 3 toward the center of the strap, i.e., against the peripheral surface of the hose 35 when the hooks 37 are disengaged from the platform while the strap 1 surrounds an end portion of the hose. The member 39 has grooves 40 for ribs at the inner side of the platform; such ribs are formed as a result of the provision of grooves 38.

FIG. 17 shows that the grooves or recesses 38 need not be exactly parallel to each other; they converge toward each other in the circumferential direction of the strap 1 (note the acute angle beta in FIG. 17) and the minimum distance between the bent over tips of the hooks 37 in the grooves 38 is preferably less than the maximum width of the working end of a screw driver 41 (FIG. 17) or an analogous implement which is used to enable the spring 17 to dissipate some of the stored energy. The working end of the screw driver 41 is introduced between the tips of the hooks 37 substantially tangentially of the strap 1 (note the right-hand implement 41 of FIG. 17) so that the working end moves the hooks apart and ultimately expels their tips from the respective grooves 38. This enables the insert 3 to move radially inwardly under the bias of the spring 17 and to reduce the diameter of the hose clip, i.e., the diameter of the substantially or exactly cylindrical surface including the internal surface of the insert 3 and the non-overlapped portion of the inner side of the strap 1 is reduced below the outer diameter of the hose 35 in undeformed condition of the hose. Therefore, the internal surface of the hose 35 is caused to bear against the peripheral surface of the tubular body 36 with a force which suffices to prevent the escape of a fluid medium (gas or liquid) from the path which is defined by the parts 35, 36.

Alternatively, the tips of the hooks 37 can be expelled from the respective grooves 38 by the working end of a screw driver 41 which is held in an orientation corresponding to that of the left-hand screw driver of FIG. 17. Such implement is moved substantially radially inwardly so that its working end is located between the bent-over tips of the hooks 37, and the implement is then turned about its axis to disengage the insert 3 from the platform of the strap 1 and to thus permit partial expansion of the spring 17.

If the hooks 37 are at least slightly elastic, they are ready to automatically reenter the respective grooves 38 in response to radially outward movement of the insert 3 toward the reinforcing member 39. If the hooks 37 are made of a ductile material, they must be bent by a tool (e.g., by pliers) subsequent to radially outward movement of the insert 3 toward the reinforcing member 39 so that the tips of the hooks can reenter the respective grooves 38. Radially outward movement of the insert 3 (e.g., in order to reengage the hooks 37 with the platform of the strap 1) can be effected by resorting to the same implement (41) which is used to disengage the hooks from the platform, i.e., which is used to enable the spring 17 to dissipate some of the energy. The working end of the implement 41 is then introduced between the hose 35 and the insert 3 or between the hose 35 and the non-overlapped portion of the inner side of the strap 1, and the working end is turned so that it compels the insert 3 to move toward the reinforcing member 39.

The grooves 38 are optional, i.e., the tips of the hooks 37 can bear against a smooth external surface of the platform of the strap 1. However, such grooves are preferred at this time because the spring 17 can be maintained in fully or nearly fully stressed condition with a high degree of reliability, i.e., the hooks 37 are much less likely to become disengaged from the strap. The grooves 38 are presently preferred on the additional ground that they contribute to the reinforcing action of the member 39 if they develop as a result of deformation of the platform of the strap 1.

An advantage of the hose clip of FIGS. 17-22 over the hose clips of FIGS. 1-16 is its simplicity. Thus, the hooks 37 and the simple plate-like reinforcing member 39 replace the tightening device 2. In addition, the spring 17 can be maintained in strongly compressed condition up to the very instant when the hose clip of FIGS. 17-22 is to be put to use. On the other hand, the hose clips of FIGS. 1-16 exhibit the advantage that they can be put to use subsequent to insertion of the tubular body 36 into the hose 35. The hose clips of FIGS. 1-16 exhibit the additional advantage that their springs need not be stressed in advance, i.e., the initial stressing of such springs is invariably less than the stressing which is needed when the hose clips are in actual use. Referring, for example, to FIG. 1, the spring 4 will be stressed only when the strap 1 already surrounds a hose and the screw or bolt 6 of the device 2 is rotated in a direction to tighten the strap around the external surface of a hose.

The hose clip which includes the structure of FIG. 23 differs from the hose clip of FIGS. 17-22 in that the coil spring 17 is replaced with a leaf spring 4 which is similar to that of FIG. 6 except that its rounded ends 10' abut the reinforcing member 39 rather than the insert 3. The median portion of the spring 4 of FIG. 23 has a concave inner side which abuts the adjacent portion of the convex external surface of the insert 3. The spring 4 of FIG. 23 is shown in stressed condition in which the tips of the hooks 37 (only one shown) extend into the grooves at the outer side of the platform of the strap 1. The curvature of the median portion of the spring 4 matches that of the adjacent portion of the external surface of the insert 3.

FIG. 24 shows a portion of a hose clip which constitutes a modification of the hose clip of FIG. 23. The difference is that the bent ends 10' of the leaf spring 4 bear against the convex external surface of the insert 3 and that the outer side of the median portion of the spring 4 abuts the reinforcing member which is inwardly adjacent the platform of the strap 1. The spring 4 of FIG. 24 is shown in partly relaxed condition, i.e., the tips of the hooks 37 (one shown in FIG. 24) are disengaged from the strap.

FIG. 25 shows a portion of a further hose clip which constitutes a modification of the hose clips of FIGS. 17-22, 23 and 24. The end portions or tips of the hooks 37' are bent outwardly, i.e., away from each other, and are received in eyelets 42 at the ends of a yoke 43 which extends in parallelism with the axis of the strap 1 and has at least one weakened portion 44. The portion 44 can be broken by inserting the working end of a screw driver 41 or another suitable implement between the inner side of the yoke 43 and the outer side of the platform of the strap 1 and by thereupon turning the working end. When the yoke 43 breaks along the weakened portion 44, the thus obtained halves of the destroyed yoke become separated from the respective hooks 37' or assume positions such that the insert 3 can move radially inwardly because the spring (not shown in FIG. 25) is free to dissipate some energy. The spring between the reinforcing member 39 and the insert 3 of FIG. 25 can be a leaf spring (such as the leaf spring 4 of FIG. 23 or 24) or a coil spring (such as the coil spring 17 of the hose clip which is shown in FIGS. 17-22).

The portion 44 of the yoke 43 can be weakened by providing it with an internal and/or an external groove, by cutting into it a slit which extends from the outer side toward but short of the inner side of the yoke or vice versa, by providing the yoke with a row of perforations, or in any other suitable way. Furthermore, the yoke 43 can be weakened by reducing the width of that portion which is to be destroyed (i.e., which is to break) in order to ensure that the insert 3 becomes disconnected from the platform of the strap 1.

The yoke 43' of the hose clip which is shown in FIG. 26 resembles the leaf spring 4 of FIG. 24; it has inwardly bent end portions which are overlapped by the outwardly extending tips of the hooks 37'. This yoke need not be provided with one or more weakened portions because it can be separated from the tips of the hooks 37' by the simple expedient of pushing or pulling it in the circumferential direction of the strap (not shown in FIG. 26) so that it slides off the tips of the hooks 37'. Such pushing or pulling can be performed by resorting to a screw driver, to pincers or tongs, or to any other suitable implement. The yoke 43' is preferably made of a resilient material, e.g., spring steel. However, it is equally possible to make the yoke of a suitable resilient plastic material. The two ends of the yoke 43' are bent inwardly through angles of approximately 180°.

An advantage of the hose clip of FIG. 26 is that the yoke 43' can be reused as often as desired. Moreover, the yoke 43' can be disengaged from the hooks 37' in a very simple and time-saving manner, i.e., all that is necessary is to push or pull the yoke in the circumferential direction of the strap until the inwardly bent ends of the yoke move beyond the tips of the respective hooks 37'. However, it is equally possible to insert the working end of a screw driver or an analogous implement between the inner side of the yoke 43' and the outer side of the platform of the strap and to thereupon turn the working end so that the yoke is detached from the hooks by moving radially outwardly and away from the platform of the strap.

The length of the hooks 37' (as measured radially of the strap 1) can be readily selected in such a way that the spring of springs of the hose clip of FIG. 25 or 26 are subjected to a desired initial compressive stress. The extent of initial compression can but need not be such that the neighboring convolutions of a coil spring 17 actually abut each other (see FIGS. 18 and 19) when the tips of the hooks 37' are engaged by the yoke 43 or 43'.

Hose clips of the type shown in FIGS. 17-26 will be put to use when it is desired to ensure that a hose is properly engaged and maintained in sealing contact with an inserted tubular body with a minimum of delay, i.e., as soon as the tubular body is inserted into a hose which is already surrounded by a hose clip. The only step which is required to complete the establishment of a sealing connection between the tubular body and the hose is to expel the tips of the hooks 37 from the grooves 38 of the strap 1, to break the yoke 43 at 44 or to slip the yoke 43' off the tips of the hooks 37' which are shown in FIG. 26.

The hose clips which are shown in FIGS. 17-26 are susceptible of many additional modifications. For example, the spring 17 which is used in the hose clip of FIGS. 17-22 can be installed in the socket of a housing corresponding to the housing 28 of FIGS. 13 to 15. Such housing can be provided with two or more recesses each of which can receive a discrete coil spring 17, a discrete C-shaped spring 34 or a discrete package of dished springs.

The endless strap 1 which is shown in FIGS. 17-22 can be replaced with a strap 1 of finite length (such as the strap of FIG. 1) and the hose clip then further comprises a tightening device 2 or analogous tightening means for the strap. The insert 3 which is shown in FIGS. 17 to 26 can be replaced with an insert of the type shown in FIGS. 2, 5 and 5a.

The illustrated springs 4, 17 and/or 34 can be made, at least in part, of a resilient or elastomeric material which can stand pronounced fluctuations of temperature and is resistant to corrosion and/or other influences of air, water or any other fluid medium which is conveyed in the conduit including a hose 35 and a rigid tubular body 36. Furthermore, the material of the springs 4, 17 or 34 (or of springs which are used in lieu of these springs) can be selected in such a way that the spring or springs can stand long periods of compression (see FIGS. 17-19) with minimal loss of elasticity or resiliency.

All of the illustrated hose clips exhibit the advantage that compensation for changes in elasticity of the material of the hose 35 merely necessitate deformation of the insert 3 by the selected biasing means, i.e., the extent of movement of the insert in the circumferential direction of the strap 1 is minimal or nil. Consequently, if the internal surface of the insert 3 and/or the non-overlapped portion of the inner side of the strap 1 happens to adhere to the hose 35 after a relatively long period of use of the hose clip, this does not affect or prevent automatic stressing of the hose by the insert 3. If the hose 35 is capable of some or even substantial radial expansion subsequent to pronounced cooling, the insert 3 can yield by causing the spring or springs of the biasing means to store additional energy; this ensures that the hose continues to engage the peripheral surface of the tubular body 36 with a force which is required to prevent leakage of the confined fluid medium.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hose clip comprising a generally annular strap having an inner side and an outer side; an insert adjacent said inner side, having a concave internal surface, overlapping and extending along less than one-half of said inner side and having two end portions spaced apart from each other in the circumferential direction of said strap, at least one of said end portions being movable along said inner side circumferentially of said strap; and means for biasing said insert away from said inner side so that a hose which is surrounded by said strap and by said insert is clampingly engaged by said internal surface and the non-overlapped portion of said inner side.

2. The hose clip of claim 1, further comprising means for at least temporarily coupling said insert to said strap.

3. The hose clip of claim 1, wherein said insert has an arcuate shape and a convex external surface having a first curvature, the non-overlapped portion of said inner side having a second curvature at least approximating said first curvature.

4. The hose clip of claim 1, wherein said strap has a first flexural strength and said insert has a second flexural strength which at least matches said first strength.

5. The hose clip of claim 1, further comprising means for separably coupling said insert to said strap.

6. The hose clip of claim 1, wherein said strap has marginal portions and at least said one end portion of said insert includes substantially radially outwardly extending projections adjacent said marginal portions.

7. The hose clip of claim 6, wherein at least one of said projections is resilient and said strap includes a portion which is received between said projections by snap action.

8. The hose clip of claim 1, wherein said strap has marginal portions and said insert has flanges extending radially outwardly beyond said marginal portions.

9. The hose clip of claim 8, wherein at least one of said flanges has at least one substantially V-shaped notch which diverges in a direction radially outwardly of the respective marginal portion.

10. The hose clip of claim 8, wherein at least one of said flanges has at least one pleat having a width—as measured circumferentially of said strap—which increases in a direction radially outwardly from the respective marginal portion.

11. The hose clip of claim 8, wherein the width of at least one of said flanges—as measured radially of said strap—decreases in a direction toward at least one of said end portions.

12. The hose clip of claim 1, wherein said biasing means comprises at least one leaf spring between said insert and said strap.

13. The hose clip of claim 12, wherein said spring has a substantially concave internal surface confronting said insert and first and second ends spaced apart from each other in the circumferential direction of said strap and abutting said insert.

14. The hose clip of claim 13, wherein at least one of said ends is movable along said insert in the circumferential direction of said strap, said spring further having a median portion adjacent said inner side.

15. The hose clip of claim 12, wherein said spring has a substantially concave internal surface confronting said insert and two ends spaced apart from each other in the circumferential direction of said strap and abutting said inner side, said spring further having a median portion abutting said insert.

16. The hose clip of claim 12, wherein said spring has first and second ends which are spaced apart from each other in the circumferential direction of said strap, at least one of said ends having a rounded surface abutting said insert.

17. The hose clip of claim 12, wherein said spring is an undulate leaf spring.

18. The hose clip of claim 17, wherein said spring has undulations extending in substantial parallelism with the axis of said strap.

19. The hose clip of claim 1, wherein said biasing means comprises at least one spring having a central axis extending substantially radially of said strap.

20. The hose clip of claim 19, wherein said at least one spring is a coil spring.

21. The hose clip of claim 19, wherein said at least one spring has a first end adjacent said insert and a second end adjacent said inner side, said insert having a first retainer which extends into the first end and said strap having a second retainer which extends into the second end of said at least one spring.

22. The hose clip of claim 21, wherein said first and second retainers are integral tubular portions of said insert and said strap, respectively.

23. The hose clip of claim 1, wherein at least one end portion of said insert is an undulate portion extending in the circumferential direction of said strap.

24. The hose clip of claim 1, wherein said strap has first and second end portions, and further comprising a tensioning device having a housing arranged so that said end portions of said strap extending through said housing, and means for coupling one end portion of said insert to said strap.

25. The hose clip of claim 1, wherein said strap has marginal portions and said insert has substantially centrally located and substantially radially disposed hooks extending beyond said marginal portions and cooperating with said strap to stress said biasing means prior to application of said strap around a hose, said hooks being deformable to thus enable said biasing means to dissipate energy and to bias said insert and the non-overlapped portion of said inner side against a hose.

26. The hose clip of claim 25, wherein said hooks have free ends which releasably engage said strap in stressed condition of said biasing means.

27. The hose clip of claim 26, wherein the outer side of said strap has recesses for the free ends of said hooks.

28. The hose clip of claim 27, wherein said strap has corrugations and said recesses are provided in said corrugations.

29. The hose clip of claim 1, wherein said strap has marginal portions, and further comprising means for maintaining said biasing means in stressed condition prior to application of said strap around a hose, said maintaining means including hooks provided on said insert and extending substantially radially outwardly beyond said marginal portions, said hooks having free ends and said maintaining means further comprising a yoke overlying said outer side and separably connected with said free ends.

30. The hose clip of claim 29, wherein said hooks are disposed substantially midway between the end portions of said insert.

31. The hose clip of claim 29, wherein said yoke includes at least one weakened portion along which the yoke can be broken to facilitate separation of the broken yoke from the free ends of said hooks.

32. The hose clip of claim 29, wherein said yoke has eyelets for the free ends of said hooks.

33. The hose clip of claim 29, wherein said free ends extend substantially axially of said strap and in opposite directions, said yoke having end portions which are bent inwardly toward said outer side and releasably engage said free ends.

34. The hose clip of claim 1, wherein said biasing means includes a biasing element between said insert and said inner side.

35. A hose clip, comprising an annular strap having an inner side, an outer side and two marginal portions; an insert adjacent said inner side overlapping and extending along less than one-half of said inner side, said insert having a concave internal surface, flanges extending substantially radially outwardly along and beyond said marginal portions, and two end portions spaced apart from each other in the circumferential direction of said strap, at least one of said end portions being movable along said inner side circumferentially of said strap; and means for biasing said insert away from said inner side so that a hose which is surrounded by said strap and by said insert is clampingly engaged by said internal surface and the non-overlapped portion of said inner side, said biasing means including at least one leaf spring between said insert and said strap, and said leaf spring having first and second ends, at least one of said ends having projections extending substantially axially of said strap, and said flanges having openings for said projections.

36. The hose clip of claim 35, wherein said openings are slots extending in the circumferential direction of said strap and said projections extend into the respective slots with freedom of movement in the circumferential direction of said strap.

37. A hose clip, comprising an annular strap having an inner side and an outer side; an insert adjacent said inner side, having a concave internal surface, overlapping and extending along less than one-half of said inner side and having two end portions spaced apart from each other in the circumferential direction of said strap, at least one of said end portions being movable along said inner side circumferentially of said strap; and means for biasing said insert away from said inner side so that a hose which is surrounded by said strap and by said insert is clampingly engaged by said internal surface and the non-overlapped portion of said inner side, said biasing means including at least one leaf spring between said insert and said strap, and said spring having first and second ends which are spaced apart from each other in the circumferential direction of said strap, each of said ends constituting a portion of said spring which is bent through an angle of approximately 180 degrees to overlie and to be radially spaced apart from a median portion of the spring.

38. The hose clip of claim 37, wherein at least one of said bent portions includes a tongue which extends circumferentially of said strap away from the median portion of said spring.

39. The hose clip of claim 38, wherein said at least one bent portion has a substantially U-shaped slit and said tongue constitutes an integral part of said at least one bent portion and is formed as a result of bending the material of said at least one bent portion out of said slit.

40. A hose clip, comprising an annular strap having an inner side and an outer side; an insert adjacent said inner side, having a concave internal surface, overlapping and extending along less than one-half of said inner side and having two end portions spaced apart from each other in the circumferential direction of said strap, at least one of said end portions being movable along said inner side circumferentially of said strap; means for biasing said insert away from said inner side so that a hose which is surrounded by said strap and by said insert is clampingly engaged by said internal surface and the non-overlapped portion of said inner side; and a housing between said insert and said strap, said housing having at least one socket which is open toward said insert, and said biasing means including at least one spring having a first portion in said socket and a second portion engaging said insert.

41. The hose clip of claim 40, wherein said housing has a plurality of sockets which are spaced apart from each other in the circumferential direction of said strap, said biasing means comprising at least one spring in each of said sockets.

42. The hose clip of claim 40, wherein said housing has marginal portions extending circumferentially of said strap and provided with rails extending axially of said strap, said insert having followers which track said rails.

43. The hose clip of claim 40, wherein said housing has an external surface confronting said inner side and provided with a groove for the adjacent portion of said strap.

44. The hose clip of claim 40, wherein said at least one spring is substantially C-shaped.

45. A hose clip, comprising an annular strap having an inner side and an outer side; an insert adjacent said inner side, having a concave internal surface, overlapping and extending along less than one-half of said inner side and having two end portions spaced apart from each other in the circumferential direction of said strap, at least one of said end portions being movable along said inner side circumferentially of said strap; means for biasing said insert away from said inner side so that a hose which is surrounded by said strap and by said insert is clampingly engaged by said internal surface and the non-overlapped portion of said inner side; a casing having a wall outwardly adjacent said outer side; and a pusher extending substantially radially of said strap and reciprocable in said casing, said strap having an opening for said pusher, and said biasing means including a spring reacting against said wall and bearing against said pusher to urge the pusher radially inwardly through said opening and against said insert.

46. The hose clip of claim 45, wherein said casing further comprises a second wall between said inner side and said insert and having an opening in register with the opening of said strap, said pusher having an abutment and said spring bearing against said abutment.

* * * * *